United States Patent
Klotsche

(10) Patent No.: US 7,492,781 B2
(45) Date of Patent: Feb. 17, 2009

(54) ROUTER WITH OVERFLOW MANAGEMENT

(75) Inventor: Ralf Klotsche, Neuenbürg (DE)

(73) Assignee: Alcatel, Paris (FR)

( * ) Notice: Subject to any disclaimer, the term of this patent is extended or adjusted under 35 U.S.C. 154(b) by 990 days.

(21) Appl. No.: 10/228,221

(22) Filed: Aug. 27, 2002

(65) Prior Publication Data
US 2003/0043823 A1 Mar. 6, 2003

(30) Foreign Application Priority Data
Aug. 29, 2001 (EP) ................................. 01440285

(51) Int. Cl.
*H04L 12/56* (2006.01)
(52) U.S. Cl. .................... 370/414; 370/235; 370/395.4; 370/395.71; 710/29; 710/52
(58) Field of Classification Search ............ 370/3–234, 370/235, 395.4, 395.41–395.43, 395.52, 370/395.71, 395.72, 412–418; 710/29, 52–54, 710/56, 57
See application file for complete search history.

(56) References Cited

U.S. PATENT DOCUMENTS

| | | | |
|---|---|---|---|
| 5,231,633 A | | 7/1993 | Hluchyj et al. |
| 5,761,440 A | | 6/1998 | De Marco et al. |
| 5,892,979 A | * | 4/1999 | Shiraki et al. ................. 710/52 |
| 6,055,590 A | * | 4/2000 | Pettey et al. ................... 710/56 |
| 6,141,323 A | | 10/2000 | Rusu |
| 6,226,267 B1 | | 5/2001 | Spinney et al. |
| 6,401,147 B1 | * | 6/2002 | Sang et al. ..................... 710/56 |
| 6,563,818 B1 | * | 5/2003 | Sang et al. .................. 370/379 |
| 7,110,359 B1 | * | 9/2006 | Acharya ...................... 370/235 |

2002/0146013 A1 * 10/2002 Karlsson et al. ......... 370/395.6

FOREIGN PATENT DOCUMENTS

| | | |
|---|---|---|
| EP | 0 774 848 A2 | 5/1997 |
| EP | 0 843 499 A2 | 5/1998 |
| EP | 1 079 660 A1 | 2/2001 |

(Continued)

OTHER PUBLICATIONS

Aweya, J. et al., "Enhancing Network Performance with TCP Rate Control," IEEE Global Telecommunications Conference, GLOBECOM '00. Nov.-Dec. 2000, vol. 3. pp. 1712-1718.*

(Continued)

*Primary Examiner*—Chi H Pham
*Assistant Examiner*—Donald L Mills
(74) *Attorney, Agent, or Firm*—Sughrue Mion, PLLC

(57) ABSTRACT

The object of the invention is to create a router which has an enhanced processing speed. According to the invention, before access through a readout unit, the pointers for information packets stored in the buffer memory are arranged as required. If an overflow is imminent in a buffer memory area, for example, then individual pointers are selected and removed from the buffer memory area. The selected pointers are shifted into an additional buffer memory area, for example. This additional buffer memory area is then preferentially read out, so that the selected pointers are read out before the pointers in the buffer memory area. The criterion for the selection of a pointer is, for example, an expired reactivation time or a buffer memory area that is filled above a threshold value.

13 Claims, 2 Drawing Sheets

FOREIGN PATENT DOCUMENTS

| | | |
|---|---|---|
| EP | 1549002 A1 * | 6/2005 |
| WO | WO 00/30307 A1 | 5/2000 |
| WO | WO 00/52882 | 9/2000 |
| WO | WO 01/03400 A2 | 1/2001 |
| WO | WO 01/31882 A1 | 5/2001 |
| WO | WO 2006051244 A1 * | 5/2006 |

OTHER PUBLICATIONS

Yiewi Thomas Hou et al, "A differential services architecture for multimedia streaming in next generation Internet", Computer Networks, 32 (2000), pp. 185-209.

* cited by examiner

ROUTER WITH OVERFLOW MANAGEMENT

TECHNICAL FIELD

The invention concerns a router.

The invention is based on a priority application EP 01 440 285.3, which is hereby incorporated by reference.

BACKGROUND OF THE INVENTION

Routers are used in telecommunication networks as an interface, for example, between a backbone network based on an Internet protocol and an access network, for example a DSL network; DSL=Digital Subscriber Line. DSL networks are constructed as ADSL, SDSL, VHDSL, for example, where A stands for Asymmetric, S for Symmetric and VH for Very High.

A router usually contains a packet memory and a readout unit and is used to route received information packets. The received information packets are temporarily stored in the packet memory. Routers which do not distinguish between service qualities operate on the FIFO (first in first out) principle, that is to say each packet is forwarded immediately on receipt. Routers which distinguish between different service qualities and have to handle each individual data flow separately, evaluate parts of each packet and compare it with a list of classifications which enable the assignment of the packet to a data stream. After the assignment, only pointers to the information packets are temporarily stored in a buffer memory. The classifier is provided in order to extract the pointers of the information packets from the received packet stream, to evaluate them and to feed them to at least one buffer memory. The readout unit is used to read out the temporarily stored pointers and, by means of the read-out pointers, to detect and read out the information packets assigned to the read-out pointers. A so-called weighted round robin (WRR) mechanism is used for the readout procedure. In this case, different buffer memory areas are read out one after the other and in predetermined time windows. This process ensures that, at the outputs of the routers, each data flow and each service class receives the bandwidth provided for it. The sequence of the packets between the various data flows con certainly change, but the packet sequence does not change within a data flow.

Information packets are usually transmitted in different, so-called Quality of Service (QoS) classes. A quality of service class specifies the so-called Voice over Internet Protocol (VoIP), for example. Another quality of service class specifies the so-called Best Effort (BE) service, for example. Voice, data, video, Internet web pages, etc., can be transmitted as information in information packets.

The routers which support a service-specific charging system, have to classify and route each information packet individually while taking different requirements into account.

The overall bandwidth of a transmission channel is distributed among the types of services on offer, and is comparable to the division of a circle into sectors. "Weighted" signifies that the sectors can be of unequal size to meet the specified traffic profile. The trick for QoS is that the sectors for VoIP are always slightly larger than the requirement, and that they follow one another sufficiently quickly. For best effort traffic, there is no quality guarantee and the provided bandwidth can be less than that requested. The sectors in the WRR may be too small in comparison with the emerging traffic. Best effort packets can therefore collide at the WRR, be delayed or disappear altogether.

The search for pointers requires time, thereby impairing the processing speed of the router. In addition, a longer search can lead to gaps occurring in the output information packet stream, in which no information packets are transmitted, which leads to a lower information rate. Furthermore, a predetermined time slot is reserved for the readout of a buffer area, so that the processing of the buffer memory area is impaired by a longer search, which can cause an overflow of the buffer memory area, leading to information loss.

SUMMARY OF THE INVENTION

The object of the invention is to create a router which has an enhanced processing speed.

This object is achieved by a router containing at least one buffer memory for the intermediate storage of pointers for information packets in at least two different buffer memory areas, wherein at least one further buffer memory area is provided in order to store selected pointers, and wherein during the reading out of the at least one buffer memory (3), the at least one further buffer memory area is a preferred readout area compared to the at least two different buffer memory areas.

According to the invention, on access via a classifier, the pointers for information packets, which are stored in the buffer memory, are arranged as required. If an overflow is imminent in a buffer memory area, for example, then individual pointers are selected and removed from the buffer memory area. The selected pointers are shifted into an additional buffer memory area, for example. This additional buffer memory area is then preferentially read out, so that the selected pointers are read out before the pointers in the buffer memory area. The criterion for the selection of a pointer is, for example, an expired reactivation time or a buffer memory area that is filled above a threshold value. The router according to the invention takes into account individual data flows and/or service classes.

Advantageous developments are revealed in the dependent claims and in the following description.

BRIEF DESCRIPTION OF THE DRAWINGS

The invention is explained below by means of an exemplifying embodiment and with the aid of two figures, of which.

BEST MODE FOR CARRYING OUT THE INVENTION

Figure 1:
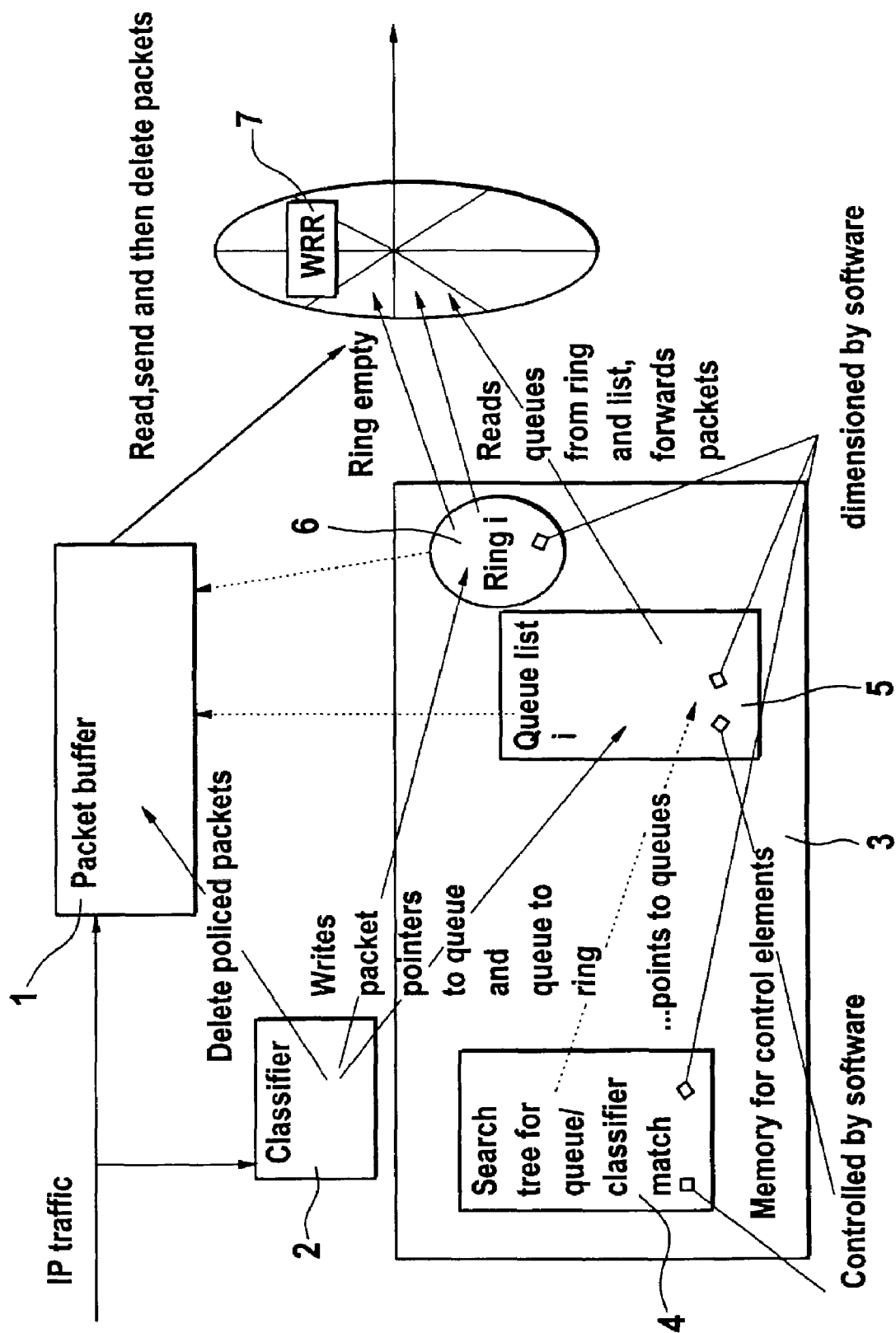
FIG. 1 shows a schematic representation of a router according to the invention.

The router in FIG. 1 contains a classifier 2, a buffer memory 3, a packet memory 1 and a readout unit 7, and is used for routing of received information packets.

The received information packets are temporarily stored in the packet memory 1. The information packets are Internet protocol packets, for example. Voice, data or video, for example, can be transmitted in them.

The pointers for the information packets, that are assigned on receipt of the information packets, are temporarily stored in the buffer memory 3. The buffer memory can consist, for example, of a memory with several memory areas or several memories, each having one or more memory areas.

The classifier 2 is provided in order to evaluate the information packets from the received packet stream and to assign and evaluate individual data flows and to feed the corresponding pointers to the buffer memory area 5 or 6, according to the data flow demand.

The readout unit 7 is used to read out the temporarily stored pointers and, by means of the read-out pointers, to detect and read out the information packets assigned to the read-out pointers. A so-called weighted round robin (WRR) mechanism is employed for the readout procedure. In the course of this, different buffer memory areas are read out one after the other and in predetermined time windows. A conventional weighted fair queuing (WFQ) assigns a certain bandwidth to each data type. The invention additionally handles individual data streams. An extended weighted fair queueing is thus realised by means of the invention.

Buffer memory 3 contains a buffer memory area 4 for a search tree, a buffer memory area 5 for storing pointers for information packets and a further buffer memory area 6 for storing selected pointers for information packets.

Figure 2:
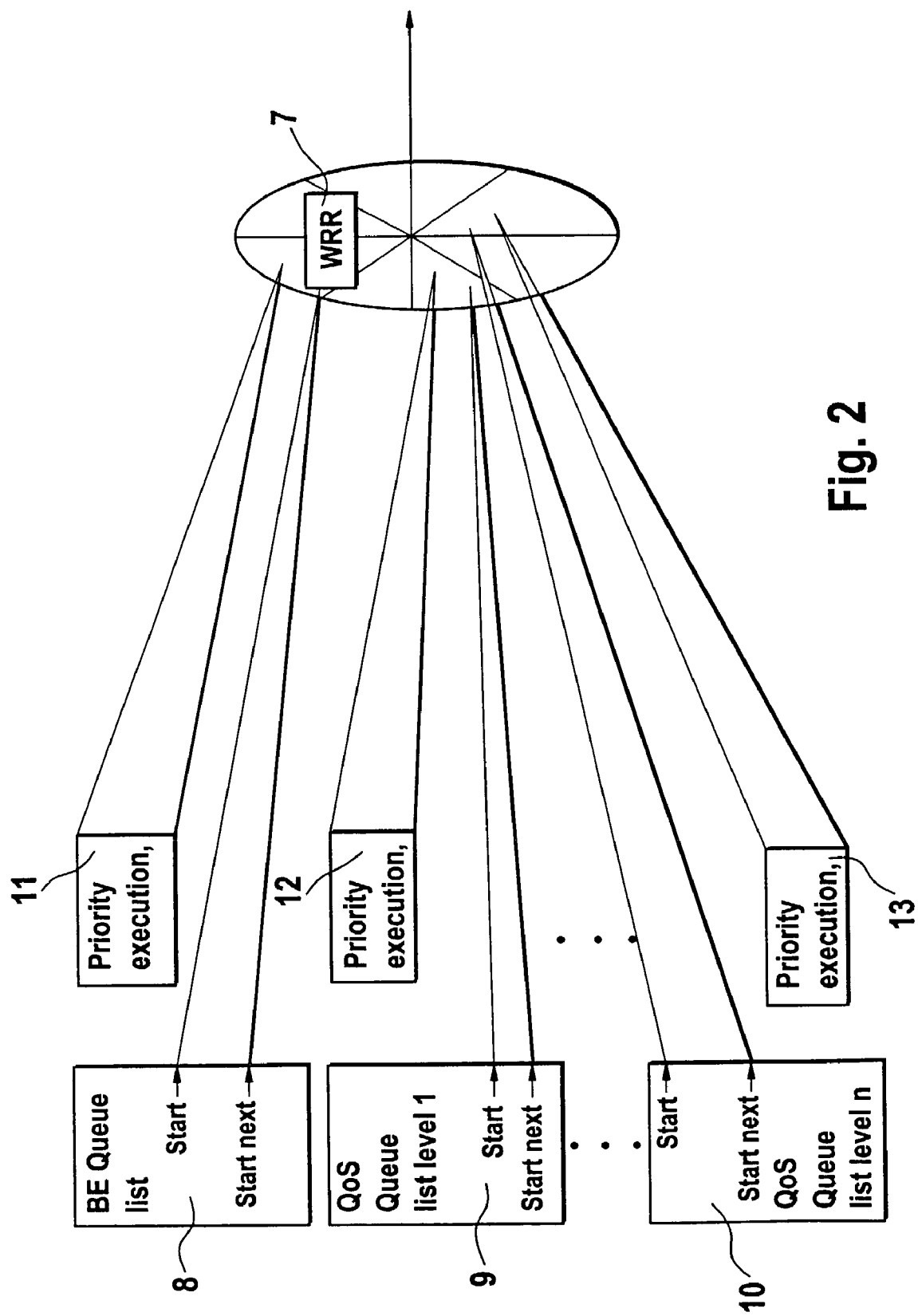
FIG. 2 shows a section of the router in FIG. 1.

Buffer memory area 5 contains buffer memory areas 8, 9, 10, that are shown in FIG. 2 and are used for storing pointers for information packets having different quality of service classes.

The further buffer memory area 6 contains buffer memory areas 11, 12, 13, that are shown in FIG. 2 and are used for storing selected pointers for information packets having different quality of service classes. Buffer memory area 11 is assigned to buffer memory area 8, buffer memory area 12 to buffer memory area 9, buffer memory area 13 to buffer memory area 10.

The buffer memory areas 4, 5, 6, 8, 9, 10, 11, 12, 13 of the buffer memory can be controlled and dimensioned by means of software.

Classifier 2 writes the pointers that are detected and assigned according to quality of service classes into the corresponding buffer memory areas 8, 9, 10. Each pointer is stored, for example, along with a reactivation time.

If a buffer memory area 8, 9, 10 is filled above a specific threshold value, or if the reactivation time of a pointer stored in a buffer memory area 8, 9, 10, has expired, one or more pointers are shifted into the assigned further buffer memory area 11, 12, 13, for example pointers from buffer area 8 into further buffer memory area 11.

The readout unit 7 has direct access to the buffer memory areas 8, 9, 10 and the further buffer memory areas 11, 12, 13. The latter are dealt with first. Each of the further buffer memory areas 11, 12, 13 has a smaller memory location capacity than the assigned buffer memory area 8, 9, 10.

Buffer memory area 8 and further buffer memory area 11 form a group. Buffer memory area 9 and further buffer memory area 12 form a further group. Buffer memory area 10 and further buffer memory area 13 form a further group. The readout unit 7 has access to a group for a predetermined time period. The further buffer memory area, for example, 11, is read out first of all. The predetermined time period is set so that all pointers stored in the further buffer memory area 11 are read out and the associated data packets can continue to be sent. Each of the further buffer memory areas 11, 12, 13 can be constructed as ring memories and enable processing priorities to be graded. In the remaining time period the readout unit 7 accesses buffer memory area 8 in order to handle further data flows which do not have enhanced priority. In the case of high load, even with VoIP only a part of the buffer memory areas 8, 9, 10 are processed. But the buffer memory areas 12, 13 are always completely processed in the associated time slots in order to process individual packets which already have a high latency.

With the aid of each individual pointer the readout unit 7 again determines the associated packet and arranges its transmission.

The time period for accessing a group can be equal to or different from the time period for accessing another group.

Two or more readout units, which have access to different groups, can be used instead of one readout unit 7. Readout unit 7 can be realised in hardware and/or software. Classifier 2 can be realised in hardware and/or software.

The router can be part of a so-called interactive network adapter and can, for example, be used in conjunction with the conversion of IP or ATM protocols into DOCSIS, DVB, HFC, MAC or HFR protocols, for example.

A search list in the form of a tree structure is stored in buffer memory area 4. This search list is used to carry out a match between data elements of the packet in the packet buffer 1 and classifier 2.

A comparator disposed in the classifier 2 compares the classification elements of a header of a received information packet, that is to say, for example, an IP header, with the entries in the tree list. Each comparison discloses whether the classification element is smaller than, larger than or the same as the element of the tree list. The search list is structured in the form of a tree with three branches at each node. The result of each comparison is used for an address operation. If the corresponding address of the buffer memory area is located, the corresponding pointer is stored in the buffer memory area at the located address. Optionally, a second search list with a second tree structure is stored in the buffer memory area 4. Only one of the two tree structures is used by the comparator at the same time. The unused tree structure can be adapted, reorganised, restructured, etc., in the meantime. In this way, the comparator always uses a current and optimised tree structure.

Instead of a search list, another structure can also be used in the buffer memory area 4. In place of a direct comparison of data fields, a so-called "hashing" function can also be employed to optimise the comparison process. The use of a

The invention claimed is:

1. A router comprising:
   at least one buffer memory for intermediate storage of pointers for information packets in at least two different buffer memory areas; and
   a readout unit for reading out the at least one buffer memory,
   wherein at least one further buffer memory area is provided in order to store selected pointers;
   wherein during the reading out of the at least one buffer memory, the at least one further buffer memory area is a preferred readout area compared to the at least two different buffer memory areas,
   wherein each buffer memory area and each further buffer memory area is used for the intermediate storage of pointers for information packets that belong to a special quality of service class,
   wherein the selected pointers are pointers whose reactivation time would expire or whose existing presence or entry in a buffer memory area would lead to a filling of the buffer memory area above a threshold value,
   wherein a first buffer memory area of the at least one further buffer memory area and a second buffer memory area of the at least one further buffer memory area are assigned to different buffer memory-areas of the at least two different buffer memory areas, and
   wherein the readout unit is configured to read out different buffer memory areas one after the other in predetermined time windows and, before the readout of a buffer memory area, to read out a further buffer memory area assigned to the buffer memory area to be read out, and to read out each temporarily stored pointer in the-further buffer memory area.

2. The router according to claim 1, wherein the readout unit operates with the weighted round robin mechanism.

3. The router according to claim 1, further comprising:
a classifier which extracts the pointers of the information packets from the received packet stream, to evaluate and to feed said pointers to the at least one buffer memory.

4. The router according to claim 1, wherein each further buffer memory area is constructed as a ring memory.

5. The router according to claim 1, wherein a further buffer memory area has a smaller memory capacity than a buffer memory area, and wherein the smaller memory capacity is dimensioned in such a way that it can be processed within a time slot assigned to the further buffer memory area.

6. A router comprising:
at least one buffer memory for temporary storage of pointers for information packets in at least two different buffer memory areas;
at least one further buffer memory area which stores selected pointers; and
a readout unit which reads the at least one buffer memory, and the readout unit being configured for reading different buffer memory areas successively in predefined time windows and, before reading a buffer memory area, reading a further buffer memory area assigned to the buffer memory area to be read, and in this further buffer memory area reading each temporarily stored pointer, wherein the at least one further buffer memory area is given precedence over the at least two different buffer memory areas as read-out area in the reading out of the at least one buffer memory,
wherein each buffer memory area and each further buffer memory area being used for temporary storage of pointers for information packets, which belong to a specific quality of service class, and each buffer memory area being assigned a further buffer memory area, characterized by a means that moves a selected pointer into a further buffer memory area, if the reactivation time of the pointer is expired or the buffer memory area is in danger of overflowing;
wherein each buffer memory area and each further buffer memory area is used for the intermediate storage of pointers for information packets that belong to a special quality of service class, and
wherein the selected pointers are pointers whose reactivation time is expired, or whose continued presence or entry in a buffer memory area would lead to filling of the buffer memory area above a threshold value.

7. The router according to claim 6, wherein the readout unit is adapted in such a way that the readout unit works with the weighted round robin mechanism.

8. The router according to claim 6, further comprising a classifier which extracts the pointers to the information packets from the received packet stream, evaluates the pointers and forwards the pointers to the at least one buffer memory.

9. The router according to claim 6, wherein each further buffer memory area is executed as a circular buffer.

10. The router according to claim 6, wherein each further buffer memory area has a lower storage capacity than a buffer memory area, the lower storage capacity being dimensioned such that the lower storage capacity can be processed within a time slot allocated to each further buffer memory area.

11. The router according to claim 1, wherein a first buffer memory area of the at least two different buffer memory areas, a second buffer memory area of the at least two different buffer memory areas, and the least one further buffer memory area are all located within the buffer memory.

12. The router according to claim 7, further comprising a read out unit, wherein the read out unit is configured to access, during a predetermined time period, a first buffer memory area of the at least two different buffer memory areas and a first buffer memory area of the at least one further buffer memory area paired with the first buffer memory area of the at least two different buffer.

13. The router according to claim 7, wherein each further buffer memory area is assigned to each buffer memory area.

* * * * *